Figure 1:
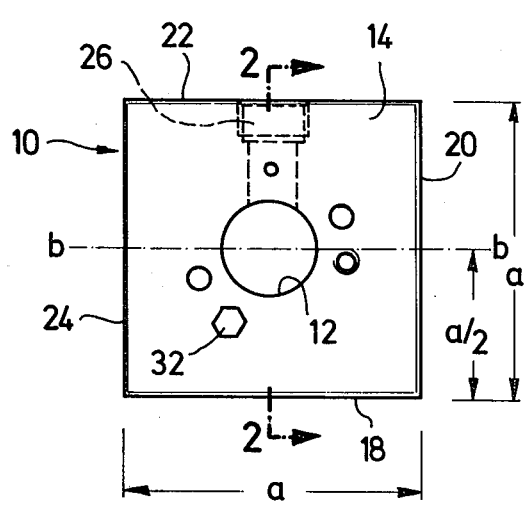

United States Patent [19]

Baumgartner

[11] 4,433,488
[45] Feb. 28, 1984

[54] DEVICE FOR SETTING THE CUTTING EDGE OF A TOOL FITTED IN A TOOL-HOLDER EXTERNALLY OF A MACHINE TOOL, OR FOR MEASURING THE SETTING OF SAID EDGE

[75] Inventor: Richard Baumgartner, Rosenheim, Fed. Rep. of Germany

[73] Assignee: Index-Werke Komm.-Ges. Hahn & Tessky, Rosenheim, Fed. Rep. of Germany

[21] Appl. No.: 355,497

[22] Filed: Mar. 8, 1982

[30] Foreign Application Priority Data

Mar. 28, 1981 [DE] Fed. Rep. of Germany ....... 3112417

[51] Int. Cl.³ .......................... G01B 5/00; B27G 23/00
[52] U.S. Cl. ..................................... 33/185 R; 33/201
[58] Field of Search .................. 33/174 H, 185 R, 201

[56] References Cited

U.S. PATENT DOCUMENTS

| | | | |
|---|---|---|---|
| 2,107,558 | 2/1938 | Zimmerman | 33/185 R |
| 3,380,321 | 4/1968 | Schaffler | 33/185 R |
| 3,490,318 | 1/1970 | Jones | 33/185 R |
| 3,546,781 | 12/1970 | Cox et al. | 33/185 R |
| 4,240,207 | 12/1980 | Benjamin et al. | 33/201 |

FOREIGN PATENT DOCUMENTS

| | | |
|---|---|---|
| 2154871 | 4/1974 | Fed. Rep. of Germany . |
| 2817898 | 2/1980 | Fed. Rep. of Germany . |
| 399858 | 11/1942 | Italy .................................. 33/185 R |
| 86974 | 7/1936 | Sweden ............................ 33/185 R |

*Primary Examiner*—Richard R. Stearns
*Attorney, Agent, or Firm*—Neuman, Williams, Anderson & Olson

[57] ABSTRACT

This invention relates to a tool presetting gauge for adjusting the cutting edge of a tool fitted in a tool holder externally of a machine tool, or for measuring the position of the cutting edge. It comprises a gauge body with a support side and a bore parallel thereto for fixing the tool holder in a setting plane. The gauge body is provided with two surfaces which are parallel to each other and perpendicular to the support side. The distance between these two surfaces is equal to the distance between the support side and the axis of the bore and the setting plane, respectively. By setting the gauge body with one of the parallel surfaces on a table plate and applying the feeler of a dial gauge onto the other one of the two parallel surfaces the dial gauge can be set to zero. While the dial gauge is held stationary the gauge body is placed with its support side on the table plate, and by means of the feeler of the dial gauge it can be found out whether the tool is in the setting plane or must be adjusted.

10 Claims, 12 Drawing Figures

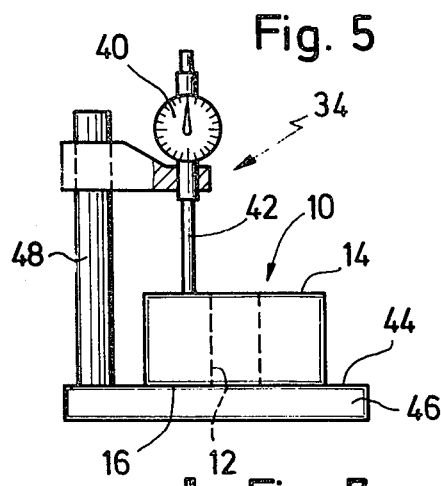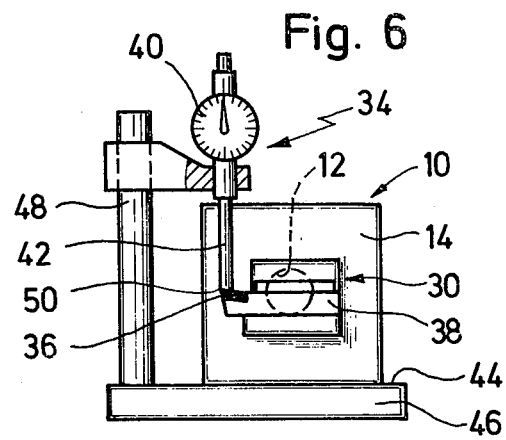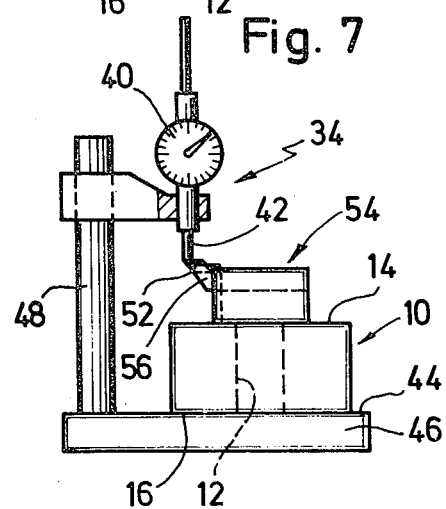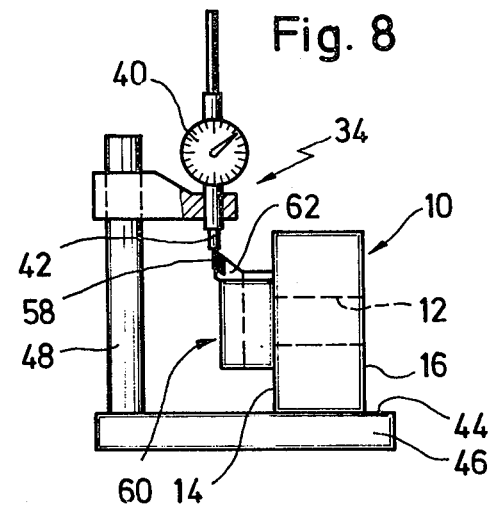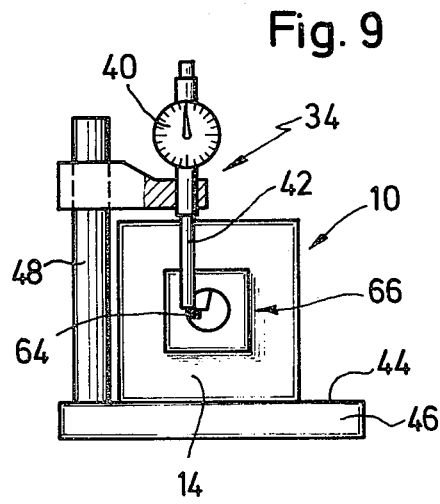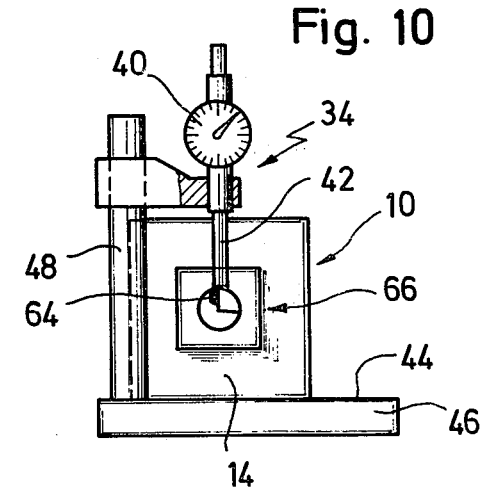

DEVICE FOR SETTING THE CUTTING EDGE OF A TOOL FITTED IN A TOOL-HOLDER EXTERNALLY OF A MACHINE TOOL, OR FOR MEASURING THE SETTING OF SAID EDGE

This invention relates to a device for setting the cutting edge of a tool fitted in a tool-holder externally of a machine tool, or for measuring the setting of the said edge, said device comprising a supporting or spot-face and holder means for fixing the tool-holder in a defined setting plane.

There is a growing tendency to use numerically controlled machine tools for all types of machining operations involving the detachment of material. For the operation of such machine tools the initial setting of the tool bits used therein is an essential and indispensible condition. To this end special purpose-designed, sometimes technically highly complex tool-edge setting devices have been developed, which are correspondingly expensive. Consequently, if only one or two such numerically controlled machine tools are in use in a machine-shop the investment in this type of tool-edge setting device is hardly justifiable in view of the high costs.

On the other hand, if a number of numerically controlled machine tools are in use in the shop it is very important to keep stopping times due to the setting up of the tool edge as short as possible. One aid to this end is provided by CNC-manual feed control units which, independently of a central programming station, enable corrections in control movements of divers machine tool units and also changes in the control programme of a given machine tool to be applied. Thus, in regard to the setting-up of the tool bits in their tool holders, it would seem obvious to look likewise for ways which enable this setting-up work to be no longer done at a central control station for all the machine tools in a given shop but directly at the affected machine tool. Hitherto these attempts were defeated by the high costs of the known tool-edge setting devices. For this reason, at most works relatively long stoppage times must still be accepted in the event of tool fracture (e.g. a broken centre bit) because the operator is obliged to take the tool holder to a remote place from the affected machine tool for the tool bit to be set up in the holder.

The invention therefore aims to create a setting-up and measuring or checking device which, by virtue of its constructional design, can be produced at an economic price and may thus be readily provided as an attachment to numerically controlled machine tools.

According to this invention this aim is realised in a device of the kind specified which is characterised in that it comprises at least one side or face which is parallel to a first supporting or spot-face and spaced from the said first supporting or spotface by a distance which is equal to the distance between the setting or adjustment plane and a second supporting or spot-face of the device which is parallel to said plane. Preferably the second spot-face and the setting plane are normal to the first spot-face.

With the aid of this kind of device it is at least possible to set the cutting edges of tool bits exactly to turning centre. In order to do this the device must be put down with its first spot-face resting on a plane reference surface. Then the zero point needed for adjusting the height of the cutting edge can be ascertained with the aid of a feeler element which is adjustable relative to said reference surface, the feeler being displaced vertically relative to the reference surface and correspondingly lined up on the face of the device which is parallel to the first supporting or spot-face, whereupon the feeler is fixed in the adjusted position thereof.

With the aid of the feeler, now fixed at zero point, it is then easy to ascertain whether, for setting the tool edge precisely to turning centre the cutting edge must be adjusted in one or the other direction. This zero-point corresponds to tool-reference point "N" in NC-machine tools.

In this manner it is very easy to set, for example right- and left-handed turning tools or drilling bits very precisely relative to turning centre.

But it is also possible to measure edge-height with the aid of this device. In this case actual tool edge position can be read off directly on a measuring gauge without recalculation. The measured value may also be fed directly through a datasection link into the machine control unit which then automatically steers the tool edge into the designed position.

In computer-assisted programmers the designed tool-data are as a general rule already stored in the tool-data store of the computer so that here the difference between actual and designed data will be fed into the programmer.

For the accomodation of tool holders which are equipped with clamping cylinders or shafts of circular cross section the device is preferably provided with holder means in the form of a receiving bore the axis of which extends in the setting plane.

In a preferred embodiment the device has the configuration of an end block or slip-gauge in which at least one edge-length is equal to the distance between its second spot-face and the setting plane parallel therewith.

This kind of configuration also enables the device to be used for further setting-up and measuring operations, such as setting the tool edge in the axial and in the radial direction as well as to turning centre, provided that the device comprises at least four plane faces two of which are mutually parallel and normal to the axis of the shaft-receiving bore whilst the other two are at right angles relative to one another and parallel to the axis of the said bore. It will be obvious that in this case the measured values may also be fed directly into the machine programmer unit through a suitable data-section link or interface.

In a preferred embodiment of the invention the device is a body which has a square plan section and the height of which corresponds to half the length of one side of said square with the axis of the shaft-receiving bore being at the point of intersection of the diagonals of the square.

With advantage such a device, which has the form of a half-cube, is a component part of a measuring apparatus comprising a plane supporting surface on a support plate and a vertically adjustable feeler, or measuring foot, which indicates the measured data through mechanical, optical magnetic or opto-electronic measuring devices.

Figure 2:
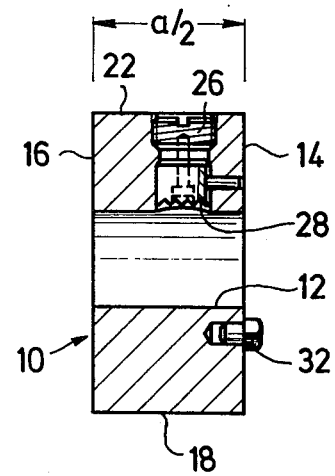
Figure 3:
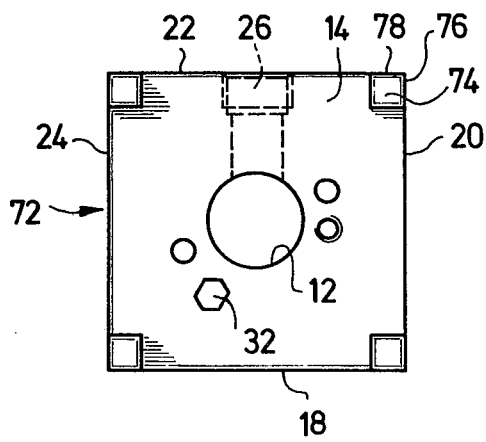
Figure 4:
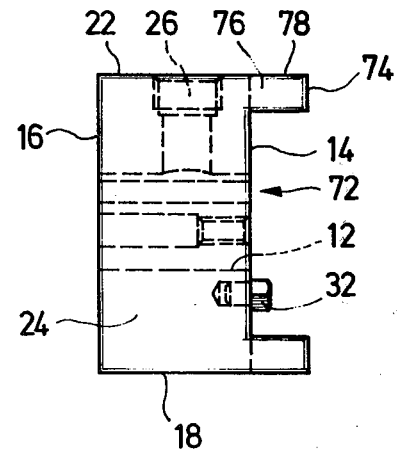

Further characteristics and details of the invention are hereinafter more particularly explained in the description of an embodiment of the invention illustrated in the accompanying drawings and/or in the claims. In the drawings, FIG. 1 is a front view of a first embodiment of the invention, FIG. 2 is a section taken on line 2—2 in FIG. 1, FIG. 3 is a front view of a second embodiment of the invention, FIG. 4 is a lateral view of the device according to FIG. 3

Figure 11:
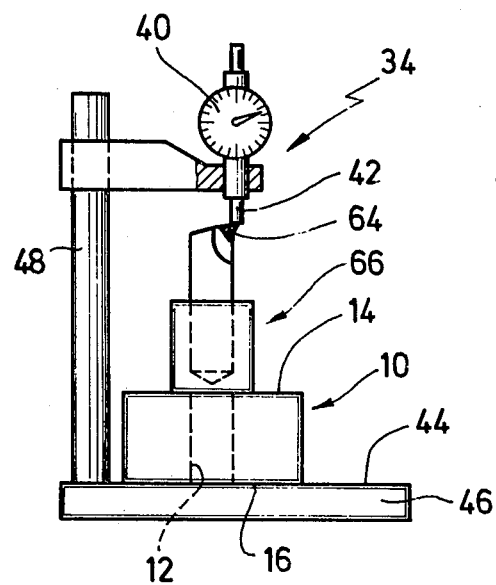
Figure 12:
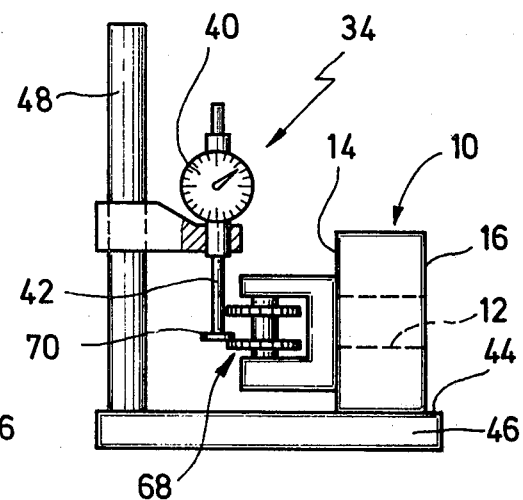

FIGS. 5 to 8 show divers setting positions of the device on the support plate of a measuring apparatus for setting the cutting edge of a turning tool which is fitted in a tool holder, FIGS. 9 to 11 show various setting positions of the device on the support plate of a measuring apparatus for setting the cutting edge of a boring bar, FIG. 12 is a similar view to FIG. 8 illustrating the arrangement as applied to the setting up of gang cutters.

The devices shown in FIGS. 1 to 4 in each case form a body 10 which has the shape or configuration of a halved cube with side-lengths a and a/2. The device is adapted to accomodate tool holders which are provided with a cross-sectionally circular and preferably cylindrical clamping shaft or shank.

For the accomodation of such a shaft or shank there is provided a bore 12 the axis of which is situated at the point of intersection of the diagonals in the square front and rear end faces 14,16. The mutually perpendicular plane side faces are shown at 18–24.

By virtue of the half-cube configuration of the body there are two mutually parallel sides, or faces, namely the front and rear end faces 14,16, which are spaced by a distance (a/2) which is equal to the distance between the side face 18, defining one spot-face, and a tool-holder setting plane b—b parallel thereto which contains the axis of the shank-receiving bore 12.

The body 10 may thus be regarded as an end-block or slip-gauge in which the length of one edge is equal to the distance between its spot-face 18 and the parallel setting plane b—b. Due to the fact that this body has the shape of a halved cube, each side face has the same radial spacing relative to the axis of the shank-receiving bore which affords an advantage in as much as some of these faces may be used for setting up the tool-bit cutting edges as well be more particularly described below.

26 is a clamping screw arranged radially of the shank-receiving bore in the body for fixing a tool-holder shank in said bore. Conveniently the end face of the clamping bolt which is adapted to be applied to the peripheral walls of the tool-holder shank is provided with a gearing 28 adapted to mesh with a corresponding gearing on said peripheral wall. In this manner a tool holder, for example shown as a whole at 30 in FIG. 6, which is suitable for application to a numerically controlled turning machine tool can be non-rotatably fixed and precisely lined up in the setting plane b—b in the body.

32 is a fixing bolt provided at the frontal end face 14 which is adapted to engage in a corresponding recess provided in the tool holder thereby allowing said tool holder to be positively lined up relative to the setting plane b—b.

The above described device, applied in conjunction with a measuring apparatus of the kind shown in FIGS. 5 to 12 where it is generally designated by reference number 34, enables, for example, the exact setting up of the cutting edge 36 of a turning bit 38 held in tool holder 30, relative to turning centre as well as in the direction of an X-axis for radial adjustment of the cutting tip relative to a work piece as well as for adjustment in the direction of a Z-axis, that is to say axially parallel to a workpiece axis.

Since the height of the body corresponds to half the side length of the square end faces 14,16 of body 10 and thus to the distance between spot-face 18 and the setting plane b—b which is parallel therewith, the body 10 will be put down with its rear end face 16 on a plane surface 44 of the support plate 46 of a measuring apparatus for adjusting a feeler or measuring foot 42, which is associated, for example with a dial gauge 40 to zero position, i.e. to the setting plane b—b. On the support plate 46 there is arranged a guide stand or bracket 48 along which the measuring foot 42 with the dial clock 40 is guided for adjustment and fixation in a vertical direction relative to the support face 44. The measuring foot can be set to zero position by being applied flush to the frontal end face 14 of the body 10 which is now on the top side and being adjusted in this position (FIG. 5). This zero position is identical with the tool-reference point "N" of the NC-machine tool.

Then the body 10 fitted with the tool holder 30 is set up on its spot-face side 18 (FIG. 6) By applying the feeler element or measuring foot to the cutting tip 50 it is now possible to ascertain the position of the latter relative to the setting plane b—b and, where necessary, to correct the position as required, or to feed the actual position thereof, as measured, that is to say the deviation of the tip corner point relative to tool reference point "N" in longitudinal and transverse direction into the so-called tool-length data store of the machine programmer unit.

FIG. 7 illustrates the setting up of the tool edge 52 of a turning bit 56 clamped fast in a tool holder 54, in the direction of the Z-axis, that is to say, axially parallel to the work-piece axis). FIG. 8 illustrates the facility of adjusting the cutting edge 58 of a turning bit 62 held in a tool holder 60, in the direction of the X-axis, i.e. radially of the workpiece axis.

FIG. 9 illustrates the adjustment by means of the device according to this invention of the cutting edge 64 of a boring bar, generally indicated at 66, to turning centre. FIG. 10 shows its adjustment or setting up in the direction of the X-axis, and FIG. 11 in the direction of the Z-axis. FIG. 12 lastly illustrates the setting up of gang cutters 68 in which case the feeler element, which in the above described measuring operations may have a cylindrical shank must be equipped with a gauge plate 70.

In view of the fact that boring bars, when clamped fast in the body, extend comparatively long beyond the frontal end face 14 of the latter, it is advisable to use a body 72 (see FIGS. 3 and 4) which at its frontal side has a projection 74, preferably one at each corner, with at least two mutually perpendicular plane faces 76,78 each of which extends in the plane of one of the two mutually perpendicular sides of the body 72. These projections prevent the body from tilting when it occupies the operative position for setting the boring bar to turning centre or for adjusting it in the direction of the X-axis (FIG. 10).

If tool holders were able to be rotatably received in the receiving bore and to be fixed in defined positions for turning centre-setting and for adjustment in the direction of axis X and Z in the body 10, it would be sufficient for this body to comprise, for example, only one plane flat side 18 the distance of which relative to the axis of the receiving bore being equal to the dimension of the body in the axial direction of said bore.

In the illustrated example the various setting-up and measuring operations can be very easily carried out by standing the body alternatively on at least two of the flat sides provided thereon.

I claim:

1. A gauge for a cutting tool having a cutting edge and carried by a tool holder, said gauge comprising a gauge body; retaining means on said gauge for securing a tool holder to the gauge body; said retaining means locating a tool cutting edge in a predetermined setting plane for such cutting edge; said gauge body having parallel first and second sides and a third side located at a predetermined distance from the setting plane; said predetermined distance being equal to the distance between the first and second sides.

2. A gauge according to claim 1 in which the tool holder is equipped with a shank of circular cross-section, and said gauge includes retaining means in the form of a shank-receiving bore having an axis which extends in the setting plane; said bore receiving the tool holder shank.

3. A gauge according to claim 2 in which said gauge body comprises at least three planar faces of which two comprise said first and second sides, and said third face comprises said third side which is disposed at right angles to said first and second sides and is arranged parallel to the axis of the shank-receiving bore.

4. The gauge according to claim 2 in which the periphery of said gauge body joining said first and second sides defines a square and the width of one side of said square is equal to half the length of one side of said square; the axis of the shank-receiving bore being located at the intersection of the diagonals of the square.

5. A gauge according to claim 4 in which the face of the gauge body on which the tool holder is mounted defines the face of a half cube and has at least one projection extending in the plane of the gauge third side on which the gauge may rest when said gauge is disposed on a supporting surface.

6. A gauge according to claim 5 in which a projection is provided at each corner of the tool-receiving face of the gauge body; each of said projections comprising at least two mutually perpendicular plane faces; each of the latter faces extending in the plane of one of the mutually perpendicular side faces of the gauge body.

7. A gauge according to claim 2 in which said gauge includes a clamping means mounted in said gauge body for securing the shank of the tool holder to said gauge when such shank is inserted into the shank-receiving bore of said gauge.

8. A gauge according to claim 1 in which the width of said gauge third side is equal to the distance between the third side and the setting plane; said third side and setting plane being in parallel relationship.

9. A gauge according to claim 1 including means on said gauge body for aligning an engaged tool holder relative to the setting plane.

10. A gauge according to claim 1 in which said gauge includes a measuring apparatus having a support plate defining a planar support surface, and a vertically adjustable distance sensor.

* * * * *